Aug. 16, 1927.

C. SCHWAN

POULTRY ROOST

Filed July 1, 1926

1,639,006

Inventor
CLARENCE SCHWAN

Patented Aug. 16, 1927.

1,639,006

UNITED STATES PATENT OFFICE.

CLARENCE SCHWAN, OF OKLAHOMA CITY, OKLAHOMA.

POULTRY ROOST.

Application filed July 1, 1926. Serial No. 119,969.

This invention relates to new and useful improvements in poultry roosts and has for its primary object to provide a novel and simplified roost which is so constructed that the collecting and breeding of vermin thereon may be effectively and efficiently eliminated.

It is well understood that while it is not an exceptionally hard matter to keep the roosting bars themselves free from vermin, yet it is extremely difficult to prevent vermin from collecting and breeding where the roosting bars are fastened onto a roost support.

Another object of the present invention is, therefore, the provision of an improved poultry roost so constructed that oil or other vermin destroying liquid may be easily and quickly applied to those parts thereof which are most apt to collect and breed vermin.

Another object of the present invention is to provide such an improved roost which is hingedly mounted so that the same may be swung upwardly and out of the way when not in use.

A further object of the present invention is to provide an improved roost of the above character which is extremely simple, yet durable in its construction, one which is practical and efficient in use, one which is easy and cheap to manufacture and one which can be placed upon the market at a small cost.

Numerous other objects and advantages of the present invention will become more readily apparent during the course of the following description when taken in connection with the accompanying drawings.

In the drawings forming a part of this application and wherein like characters of reference denote corresponding parts throughout the several views.

Figure 1:
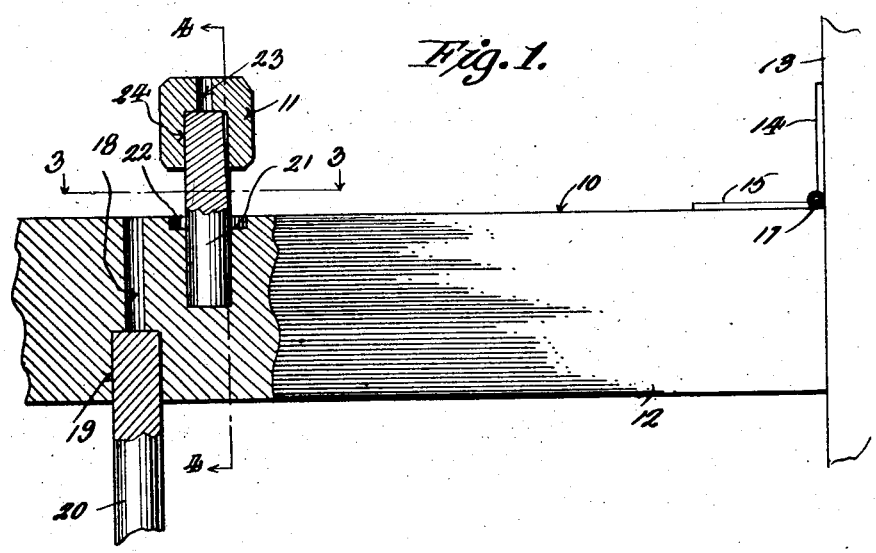
Figure 1 is a side elevation, partially in section, of an improved poultry roost constructed in acordance with the present invention.
Figure 2:
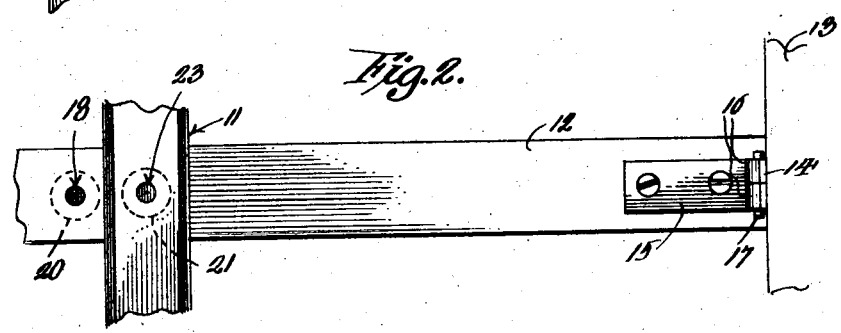
Figure 2 is a top plan view thereof.
Figure 3:
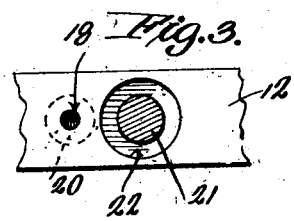
Figure 3 is a transverse sectional view taken on the line 3—3 of Figure 1 looking in the direction of the arrows.
Figure 4:
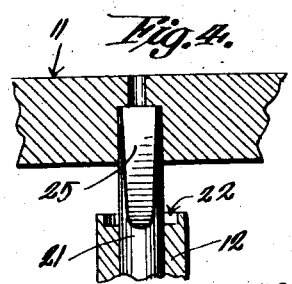
Figure 4 is a vertical sectional view taken on the line 4—4 of Figure 1 looking in the direction of the arrows.

Referring now more in detail to the accompanying drawings, wherein for the purpose of illustration has been disclosed a preferred embodiment of the present invention, the numeral 10 generally indicates the roost support and 11 the roosting bar carried thereby.

The roost support 10 consists simply of a substantially long supporting arm 12 which may be of any suitable width and thickness and as long as desired. This supporting arm 12 is hingedly connected to a suitable support 13 such as the side wall of a poultry house, by means of the complemental hinge sections 14 and 15, the hinge section 14 being secured to the support 13 while the hinge section 15 is secured to the supporting arm 12. The adjacent ends of the hinge sections 14 and 15 are provided with hinge barrels 16 which are adapted to aline with one another and through which is inserted a removable pin 17. The pin 17 is removable in order that the roost may be entirely detached from the support 13 whenever desired.

The arm 12 is provided adjacent its forward end with a vertical bore 18, the lower portion thereof being enlarged in diameter as indicated at 19 so as to receive therein the upper end of the standard 20 which serves to support the forward end of the said supporting arm.

Secured within the supporting arm 12 is a vertical dowel pin 21 and formed within the upper surface of the said arm and encircling the said dowel pin is a recess 22. The roosting bar 11 may be of any desired shape and length and is provided with a vertical bore 23, the lower portion of which is enlarged in diameter as at 24 to receive therein the upper end of the dowel pin 21, one side of the said dowel pin being flattened as at 25 which results in the formation of a vertical groove as shown in Figure 1 through which the oil or other vermin destroying liquid may seep.

In order to prevent vermin from collecting and breeding on the present improved roost, it is simply necessary to pour a quantity of the liquid into the upper ends of the bores 18 and 23. The liquid poured into the bore 18 will gravitate downwardly about the upper end of the standard 20 while the liquid placed within the upper end of the bore 23 will seep downwardly through the slot and around the dowel pin 21. A quantity of the liquid can also be placed within the recess 22 and this liquid will then seep downwardly around the lower end of the dowel pin 21. The supplying of this oil or other liquid will effectively and efficiently prevent the collecting and breeding of vermin around those parts where the vermin are most likely to collect. The hinge sections 14 and 15 are also adapted to have poured thereover the vermin destroying liquid.

From the foregoing, it will be apparent that I have provided a novel poultry roost so constructed that the collecting and breeding of vermin thereon may be efficiently and easily prevented. Also, it will be appreciated that one or more supporting arms may be employed and that the roosting bar may be as long as desired.

Changes in the details of construction may be resorted to without departing from or sacrificing the spirit of the invention so long as such changes fall within the scope of the appended claims.

What is claimed is:

1. A poultry roost of the character described, comprising a supporting arm having a recess in its upper face, a vertical supporting pin received within said arm and surrounded by said recess, a roosting bar provided with a vertical bore designed to receive in the lower part thereof the upper end of said supporting pin, and means to permit a fluid placed in the upper portion of said vertical bore to pass downwardly about said pin.

2. A poultry roost including a supporting arm having a recess in its upper face and a vertical bore adjacent its forward end, a vertical supporting pin received within the said arm and being surrounded by said recess, a roosting bar provided with a vertical bore receiving in the lower portion thereof, the upper end of said pin, and a supporting standard having its upper end received within the lower portion of the bore in said supporting arm.

3. A poultry roost including a supporting arm, a roosting bar, and means carried by said arm for supporting at its upper end the said roosting bar, said roosting bar being provided with means whereby a vermin destroying liquid may be supplied to the upper end of said supporting means.

4. A poultry roost of the character described, comprising a supporting arm, a vertical supporting pin received within said arm, and a roosting bar provided with a vertical bore designed to receive in the lower portion thereof, the upper end of said supporting pin, said pin having a portion of the side thereof adjacent the upper end, formed to allow fluid to pass downwardly thereabout from the upper portion of said bore.

5. A poultry roost of the character described, comprising a supporting arm, a vertical pin mounted in the upper face of said arm and having a portion of the side thereof, adjacent the upper end flattened, and a roosting bar provided with a vertical bore of materially greater diameter at the lower end than at the upper end and designed to receive in the lower end the upper end of said vertical pin, substantially as and for the purpose described.

In testimony whereof I affix my signature.

CLARENCE SCHWAN.